United States Patent
Mattes et al.

[11] Patent Number: 6,131,456
[45] Date of Patent: *Oct. 17, 2000

[54] SENSOR ARRANGEMENT

[75] Inventors: Bernhard Mattes, Sachsenheim; Siegfried Malicki, Ingersheim; Lothar Haas, Rosstal, all of Germany; Hans-Dieter Schmid, Odawara, Japan

[73] Assignee: Robert Bosch GmbH, Stuttgart, Germany

[*] Notice: Under 35 U.S.C. 154(b), the term of this patent shall be extended for 326 days.

[21] Appl. No.: 08/604,228

[22] Filed: Feb. 22, 1996

[30] Foreign Application Priority Data

Feb. 22, 1995 [DE] Germany ............................ 195 06 048
May 17, 1995 [DE] Germany ........................ 295 08 086 U

[51] Int. Cl.$^7$ .................................................. G01P 1/02
[52] U.S. Cl. ...................................... 73/493; 200/61.45 R
[58] Field of Search ..................... 340/429, 440, 340/689, 686; 200/61.45 R, 61.52, 61.45 M; 73/493, 514.31

[56] References Cited

U.S. PATENT DOCUMENTS

| 3,592,156 | 7/1971 | Prachar | 200/61.45 R |
| 3,778,572 | 12/1973 | Matsui | 200/61.45 M |
| 4,398,417 | 8/1983 | Shutt . | |
| 4,916,266 | 4/1990 | Tetrault | 200/61.45 R |
| 5,153,394 | 10/1992 | Abendroth | 200/61.45 R |
| 5,359,286 | 10/1994 | Kaiser | 200/61.45 R |
| 5,450,049 | 9/1995 | Bachmann | 200/61.45 R |
| 5,535,639 | 7/1996 | Ogata | 200/61.45 R |

FOREIGN PATENT DOCUMENTS 2031431 12/1971 Germany .
4101060 7/1992 Germany .

OTHER PUBLICATIONS

Evolution Em Matiere De Detecteurs De Choc. (Ingenieurs de l'Automobilr,1982 No. 6, Paris, France (no month).
Soviet Inventions Illustrated, Section II Electrical, vol. W No. 3 issued Feb. 25, 1975.

*Primary Examiner*—Hezron Williams
*Attorney, Agent, or Firm*—Michael J. Striker

[57] ABSTRACT

A sensor arrangement for determination of at least one of a position and an acceleration of a moveable body has a housing fixedly connected with the moveable body, an inertia body accommodated in the housing, a detector arranged in the housing for detecting a horizontal displacement of the inertia body, the housing having a base plate on which the detector is arranged so that determination of a vertical displacement of the inertia body is also performed.

11 Claims, 2 Drawing Sheets

SENSOR ARRANGEMENT

BACKGROUND OF THE INVENTION

The present invention relates generally to a sensor arrangement for determination of a position and/or an acceleration of a moveable body.

Sensor arrangements of the above mentioned general type are known in the art. Usually they are utilized for example in vehicles as moveable bodies to determine for example accident-related position changes or other situations which influence a position stability. They either produce a warning signal or provide control signals for safety devices. In this way a rollover process is recognized and its action is reduced.

One of such sensor arrangements is disclosed in the German patent document DE-OS 41 01 060. In this sensor arrangement a structural element which uses a so-called Hall effect is arranged in a housing of the sensor arrangement in an operative connection with a magnet element in an inertia body. A tilting movement of the inertia body leads to relative movement between the magnet element and the Hall element, and thereby corresponding output signal is produced. The evaluation of vertical movements here is not provided.

Furthermore, mercury switches are utilized and acceleration-sensitive sensors in vehicles. In such sensors the position changes of the liquid mercury releases an electrical switching process and thereby a safety device can be activated. Such sensors are disclosed for example in 1141, Ingenieurs de l'Automobile (1982) No. 6, S. 76. They however have the disadvantage that the utilization of mercury is possible only conditionally in accident-prone vehicles in view of environmental protection, and its operational region is limited to temperatures under −35° C. In motor vehicles and devices the lower operational temperature is specified as −40° C.

The European patent document EP 01 79 120 B1 discloses also a sensor arrangement which has a light beam generator and light beam detector fixedly arranged in the housing. The inertia body during a position change can interrupt the light beam and thereby produce a control signal.

SUMMARY OF THE INVENTION

Accordingly, it is an object of the present invention to provide a sensor arrangement which is a further improvement of the corresponding sensor arrangements.

In keeping with these objects and with others which will become apparent hereinafter, one feature of the present invention resides, briefly stated, in a sensor arrangement for determination of a position and/or an acceleration of moveable body provided with an inertia body located in a closed housing fixedly connected with the movable body, and a detector for determination of a horizontal displacement of the inertia body, wherein in accordance with the present invention the detector is arranged on a base plate of the housing so that it also determines a vertical displacement of the inertia body.

When the sensor arrangement is designed in accordance with the present invention it has the advantage that with a relatively simple means, it provides a detection of all position changes of the inertia body, in particular also the position change in direction of the vertical axis. In particular when there is a danger of a rollover of the moveable body, it is necessary to timely determine the vertical movements or accelerations to activate corresponding safety devices. This can be performed in the inventive arrangement both in a qualitative manner as well as in a quantitative manner.

The inventive arrangement is designed so that it is suitable to determine pre-condition values or changes with one detector, and when corresponding release criteria are exceeded to produce a switching, a controlling or a warming signal. The same arrangement can determine a tilting angle, a horizontal acceleration, and a vertical acceleration of the moveable body. In many accident situations in a street traffic it is advantageous to evaluate the street conditions simultaneously in order to activate the safety devices. With respect to the vertical acceleration, it is possible to provide through a time function that for example the vertical deviations can be considered within a time period of less than 300 ms, since it deals with harmless vibrations, for example resulting from ground waves. In the case of when inclination of the moveable body, for example of the vehicle, an inclination about the longitudinal axis of gravity greater than 55° and about the transverse axis of greater than 80° can be considered as critical, and also corresponding horizontal accelerations are detected.

In accordance with a further feature of the present invention, the inertia body can be composed of a ferromagnetic material, the housing including mechanical components arranged on or in the housing are composed of a non-magnetic material, and the detector has an electrical oscillating or resonant circuit with electromagnetic field lines which are at least partially influenceable by the position of the ferromagnetic inertia body. The oscillating or resonant frequency of the oscillating or resonant circuit of the detector can be within a high frequency region so that the detection of the position changes is especially advantageous. The ferromagnetic inertia body causes, because of the position change a different damping of the oscillating circuit, which can be converted easily to an evaluatable electrical signal of analog or digital type and then further pass it in an evaluating unit.

The inertia body can be provided with a thermoplastic protective ring. This reduces a wear of the inertia body and contributes to the operational safety of the arrangement.

In accordance with other features of the present invention, the detector can be connected with a central evaluating unit in which the influences of the oscillating condition of the oscillating circuit can be evaluated based on the different damping by the inertia body, and then warning or control signals are produced. In predetermined time points, a control of the position of the inertia body and the signals generated by the detector is performed by test sequence generated in the evaluating unit. The shape and mass of the inertia body can be selected so that a lateral tilting or a vertical lifting of the inertia body are used as a release criteria.

With these features a simple combination of electronic evaluating units provided on modern vehicles with the sensor arrangement of the invention is provided. In a predetermined test sequence the operation of the sensing arrangement can be tested.

In particular, after each initiation of the sensor arrangement, for example during starting of the vehicle, the electrical and mechanical operation of the arrangement can be tested. Since the overrolling process can slow (maximum angle of speed approximately 360°/sec), these testing sequences are repeated during the operation. Thereby, after a suitable error filtering for increasing the error tolerance, a monitoring of the warning and control signals and eventual error recognition is performed. It is also possible to provide a corresponding error code or to store it in the evaluating unit electronically. Furthermore, in a simple manner it is possible to provide threshold values which are used as released criteria, and therefore the acceleration and position changes can be determined preferably by test rows.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
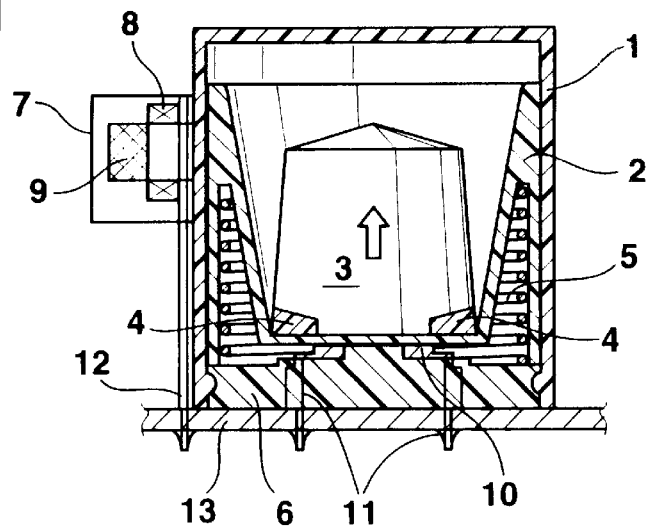
FIG. 1 is a view showing a section of a sensor arrangement in accordance with the present invention with an inertia body in a rest position.

FIG. 1 shows a sensor arrangement with a cylindrical housing 1 formed for example of a synthetic plastic material such a PBT (polybutyleneterephtalate). A sealing element 2 composed also of a synthetic plastic material is arranged in the housing 1 connectable with a movable body 13 and used for receiving a substantially ferromagnetic inertia body 3. The housing 1 is composed of a non-ferromagnetic material. The inertia body 3 is provided on its lower, outer edge with a thermoplastic protective ring 4 composed of a synthetic plastic material POM (polyactal) for wear reduction. The receiving element 2 is supported on a non-magnetic base plate 6 through a vertical spring 5 of a non-magnetic material which presses the receiving element 2 vertically against the base plate 6. The inertia body 3 is frustoconical with an upwardly narrowing shape, and the receiving body 2 has also a frustoconical shape narrowing in the same direction.

An electromagnet 7 for releasing a lateral position changes (tilting) of the inertia body 3 in a test sequence is arranged in the upper region of the housing 1. The magnetic field acts on a coil 8 of the inertia body 3. The electromagnet 7 also has an E-core 9. Alternatively, it is possible to arrange a coil 8 without an E-core which corresponds to the shape of the housing and can overlap approximately one-third of the housing surface.

A coil of a multi-wire high frequency stranded conductor is provided on the base plate 6 for a detector 10, for determination of the vertical position change of the inertia body 3 in the positive z-direction. Electrical connections 11 of the detector 10 as well as electrical connections 12 of the magnet coil 7 are guided on a printed board 13, in which the whole sensor arrangement is mechanically held. the detector 10 has an electrical oscillating circuit with electromagnetic field lines which are at least partially influenceable by a position of said ferromagnetic inertia body.

Figure 2:
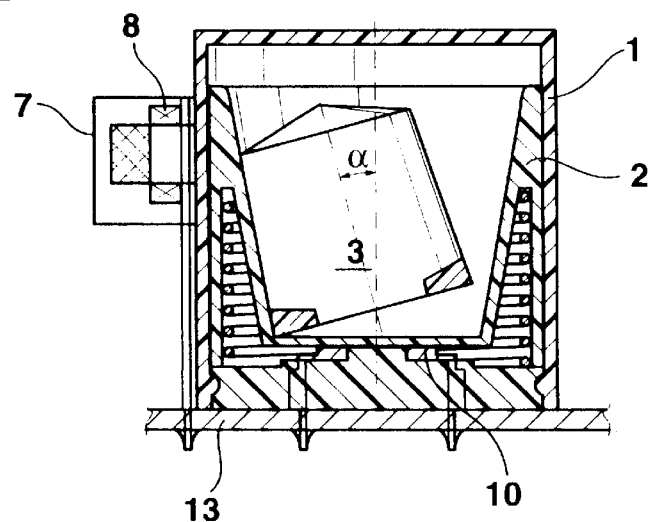
FIG. 2 is a view showing a section of a sensor arrangement in accordance with the present invention with a position change of the inertia body, for example in a test condition.
Figure 4:
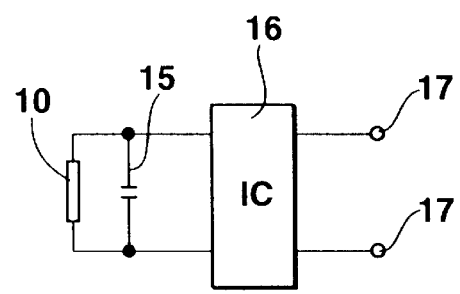
FIG. 4 is a view schematically showing an electronic oscillation circuit of the inventive sensor arrangement.

FIG. 2 shows a lateral tilting of the inertia body 3 with an abutment against the wall of the receiving element 2. In the shown example the magnetic coil 7 is activated in a test sequence for testing the operational property of the sensor arrangement. Since the ferromagnetic inertia body 3 is moved back farther from the coil of the detector 10, a change of the damping of the electrical oscillation circuit (compare FIG. 4) of the detector 10 occurs. This change can be evaluated for producing a signal.

With the additional evaluation of the change speeds of the oscillation circuit damping, it is also possible to determine the acceleration values for the transverse acceleration as well as for the vertical acceleration and use the same for the evaluation. A not shown evaluating device can use these detection signals for producing control signals for corresponding warning or safety devices. These devices can be used for releasing the overrolling protection devices for a vehicle with an open folding top or safety belt devices for vehicles of all types.

The shape and the mass of the inertia body 3 is dimensioned so that when a predetermined inclined position of the vehicle is exceeded or starting from a predetermined horizontal acceleration, the inertia body 3 is moved from its rest position and tilted laterally and in some cases during a vertical acceleration is lifted from the base plate 6. For this purpose the inertia body 3 has a frustoconical narrowing and the receiving body 10 has a corresponding expansion upwardly. Suitable release criteria for the tilting are substantially an angle of inclination of the vehicle relative to a vertical vehicle axis of greater/equal 55°, or corresponding omni-directional acceleration of the vehicle in the horizontal plane of greater/equal 1.4 g (g is ground acceleration due to gravity). This criterium for the lifting of the inertia body 3 from the base plate 6 is a vertical acceleration of the sensor arrangement in negative z-direction of greater/equal 0.4 g or a bottom contact loss of the vehicle.

Alternatively, different sensitivities independence on the loading direction of the vehicle can be used as a release criteria, for example, an exceeding of the inclination angle around the longitudinal axis in a traveling direction, about which the vehicle is tilted lighter due to the longitudinal expansion, at approximately 55°, or a corresponding transverse acceleration of approximately 1.4 g, or an exceeding of the inclination angle about the transverse axis of approximately 80°, or a longitudinal acceleration of approximately 5.7 g. The sensitivity in the vertical direction is in principle not influenced. These different sensitivities can be obtained by an oval design of the inertia body 3 and the receiving element 2. The sensor sensitivity is then determined by the distance of the center point of the base surface relative to the edge of the base surface in the loading direction. A greater distance means here a smaller sensitivity, or in other words in a vehicle longitudinal direction the distance must be greater than in a transverse direction.

Figure 3:
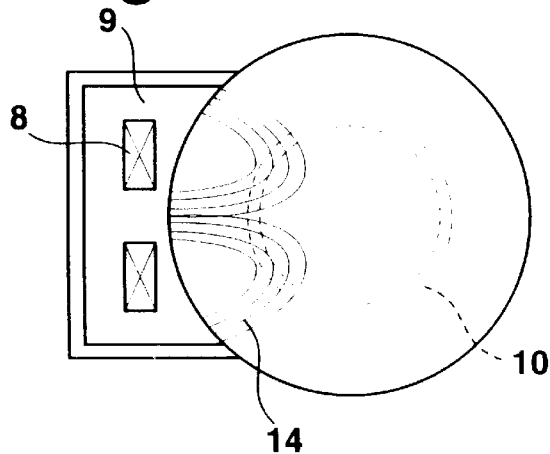
FIG. 3 is a view showing a section through a sensor arrangement in accordance with the present invention on a plan view.

FIG. 3 shows the section of the sensor arrangement in the plane of the electromagnet 7, which illustrates the E-core 9 and the coil 8 with their magnetic field lines 14. Furthermore, the detector is shown on the base plate 6 in broken line. The force action of the field of the coil 8 onto the inertia body 3 for producing the tilting in the test case is clearly recognizable. In the right schematic illustration of FIG. 4 the coil of the detector 10 is shown as a component of an oscillating circuit (resonant circuit) with a capacitor 15 and an integrated high frequency switching circuit 16. The output signals of the oscillating circuit can be supplied through a conductor 17 to the evaluation unit eventually via a vehicle bus system. The elements 15, 16, 17 form a central evaluating unit. The evaluating unit generates test sequences which in predetermined time points perform a control of position of the inertia body and of signals generated in the detector.

Figure 5:
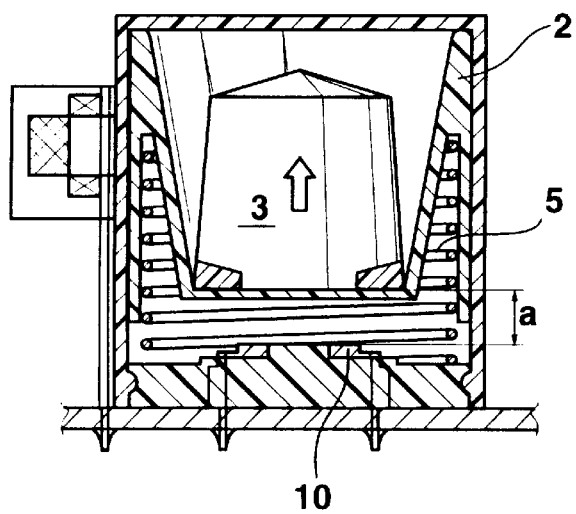
FIG. 5 is a view showing a further longitudinal section through the inventive sensor arrangement with a deviation of the inertia body in a vertical direction.
Figure 6:
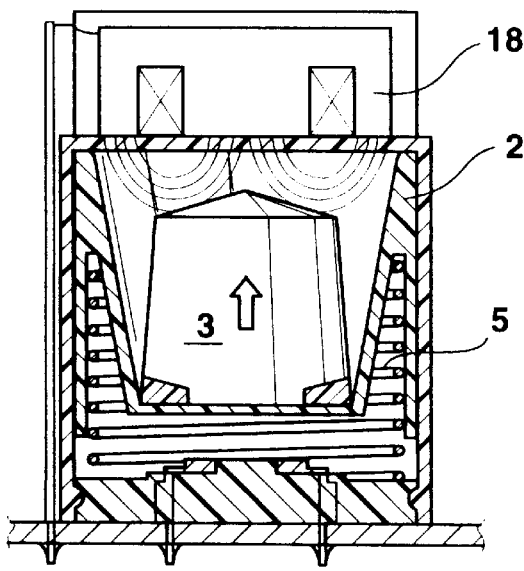
FIG. 6 is a view showing another modification of FIG. 5 with an additional magnet coil in a housing cover of the inventive sensor arrangement.

The position change of the inertia body 3 during a vertical acceleration of the sensor arrangement in a negative z-direction is shown in FIG. 5. The receiving element 2 inside the housing 1 moves together under the action of the spring 5 in a spring path a. A further embodiment example of FIG. 6 shows an additional magnet coil 18 arranged above the upper housing cover and having a cup core 18a which can be formed for the realization of vertical movements of the inertia body 3 supported by the spring 5. Thereby, also the coil 18 can be formed for performing the test sequence, so that the whole inertia body 3 can be lifted.

Figure 7:
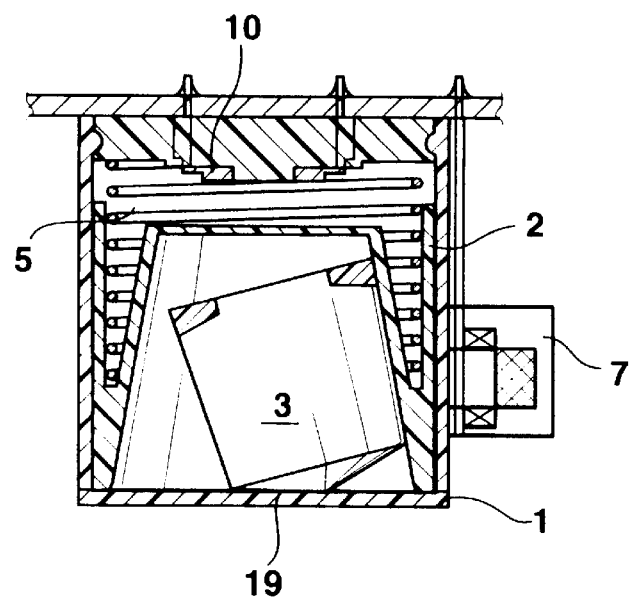
FIG. 7 is a view showing the inventive sensor arrangement during an overrolling process.

FIG. 7 shows the condition of the sensor arrangement after an overrolling process. The receiving body and the inertia body 3 are pressed by the force of gravity against the upper housing cover. Due to the overrolling, the inertia body 3 is tilted by the horizontal acceleration and comes to abutment against a conical, flattened side 19. The thusly produced extreme action of the oscillating circuit in the detector 10 leads to a corresponding output signal which can further be processed in the evaluation unit.

It will be understood that each of the elements described above, or two or more together, may also find a useful application in other types of constructions differing from the types described above.

While the invention has been illustrated and described as embodied in a sensor arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said inertia body being composed substantially of a ferromagnetic material, said housing being composed of a non-ferromagnetic material, said detector being provided with an electrical oscillating circuit with electromagnetic field lines which are at least partially influenceable by a position of said ferromagnetic inertia body.

2. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said housing having cylindrical housing portion fixedly connected with said base plate; and a receiving element arranged inside said housing for receiving said inertia body and abutting with a vertical prestress against said base plate with interposition of a spring.

3. A sensor arrangement as defined in claim 2, wherein said inertia body has a frustoconical upwardly narrowing shape, said receiving body having also a frustoconical shape narrowing in direction in which said frustoconical shape of said inertia body narrows.

4. A sensor arrangement as defined in claim 3, wherein said inertia body has an upper end provided with a conical flattening.

5. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed; and an electromagnet having an E-core which is open toward said inertia body for horizontally moving said inertia body so as to deviate said inertia body for testing purposes.

6. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said housing having an upper housing cover; and an electromagnet with a cup core arranged on said upper housing cover for producing vertical movements of said inertia body so as to deviate said inertia body for testing purposes.

7. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said detector having an oscillating circuit with an oscillating frequency in a high frequency region.

8. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said detector having an oscillating circuit; and further comprising a central evaluating unit connected with said detector and formed so that it evaluates influence of oscillating property of said oscillating circuit under the action of different damping by said inertia body and produces signals selected from the group consisting of warning signals and control signals.

9. A sensor arrangement as defined in claim 8, wherein said evaluating unit generates test sequences which in predetermined time points perform a control of a position of said inertia body and of signals generated in said detector.

10. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said inertia body having a shape and a mass selected so that for at least one of a lateral tilting and a vertical lifting of said inertia body the following values are predetermined:

- an inclination angle of the moveable body is at least equal 55°
- an omni-directional acceleration in a horizontal plane is at least equal 1.4 g,
- a vertical acceleration is at least equal 0.4 g wherein g is acceleration due to gravity.

11. A sensor arrangement for determination of at least one of a position and an acceleration of a moveable body, comprising a housing fixedly connectable with the moveable body; an inertia body accommodated in said housing; a detector arranged in said housing for detecting a horizontal displacement of said inertia body, said housing having a base plate on which said detector is arranged so that determination of a vertical displacement of said inertia body is also performed, said inertia body having a shape and a mass selected so that for at least one of a lateral tilting and a vertical lifting of said inertia body the following values are predetermined:

- an inclination angle of the moveable body is at least equal 55°
- an omni-directional acceleration in a horizontal plane is at least equal 1.4 g,
- a vertical acceleration is at least equal 0.4 g wherein g is acceleration due to gravity.

* * * * *